(12) United States Patent
Dunlap

(10) Patent No.: US 6,615,368 B1
(45) Date of Patent: Sep. 2, 2003

(54) SYSTEM AND METHOD FOR DEBUGGING HIGHLY INTEGRATED DATA PROCESSORS

(75) Inventor: Frederick S. Dunlap, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,495

(22) Filed: Jan. 4, 2000

(51) Int. Cl.[7] .................................................. G06F 9/00
(52) U.S. Cl. ............................ 714/30; 714/35; 714/38; 717/127
(58) Field of Search ........................... 714/30, 35, 38; 717/127

(56) References Cited

U.S. PATENT DOCUMENTS

| | | | | |
|---|---|---|---|---|
| 5,734,881 A | * | 3/1998 | White et al. ................. | 712/238 |
| 5,996,071 A | * | 11/1999 | White et al. ................. | 712/238 |
| 6,035,422 A | * | 3/2000 | Hohl et al. ................... | 712/244 |
| 6,142,683 A | * | 11/2000 | Madduri ....................... | 712/207 |
| 6,145,097 A | * | 11/2000 | Moyer et al. ................. | 712/227 |
| 6,205,560 B1 | * | 3/2001 | Hervin et al. ................ | 712/238 |
| 6,286,114 B1 | * | 9/2001 | Veenstra et al. ............. | 712/238 |
| 6,442,707 B1 | * | 8/2002 | McGrath et al. ............... | 714/30 |

* cited by examiner

Primary Examiner—Scott Baderman
Assistant Examiner—Anne L. Damiano

(57) ABSTRACT

There is disclosed a data processor having improved debugging features that output from the data processor selected instructions, data, or addresses in response to the occurrence of one or more of events in the data processor. The events include execution of a branch instruction, detection of a trigger value on an internal bus, or execution of a unique spray instruction.

21 Claims, 4 Drawing Sheets

SYSTEM AND METHOD FOR DEBUGGING HIGHLY INTEGRATED DATA PROCESSORS

TECHNICAL FIELD OF THE INVENTION

The present invention is directed, in general, to processing systems and, more specifically, to systems and methods for debugging a highly integrated microprocessor.

BACKGROUND OF THE INVENTION

The last two decades have seen rapid growth in the power and complexity of microprocessors. At the same time, the price of microprocessors, relative to other technologies and adjusted for inflation, has decreased. As a result, desktop personal computers and other microprocessor-dependent processing systems are affordable to a large segment of the population and are more powerful that some not-very-old mainframe computers.

The greatly increased complexity of microprocessors, however, has its drawbacks. As more and more functions are either expanded in or added to a microprocessor, the ability of a programmer or engineer to debug problems in a microprocessor or problems in software executed by a microprocessor becomes diminished. This happens, in part, because there are a limited number of pins on a microprocessor that can be used to access and examine the internal registers, buses, interfaces, caches, instruction units, functional units, and other components of a microprocessor. For example, reads and writes to an on-chip level one (L1) cache in a microprocessor are not directly observable on an external pin of a microprocessor.

A number of techniques may be used to debug a conventional microprocessor and/or to debug software executed by a microprocessor. One technique involves editing source code to include unique print statements associated with particular program branches in order to determine the paths the program took during execution. Another technique involves using a debugger, which causes a program to execute to some break point and then halt. This allows a programmer to modify memory, to analyze certain registers (such as debug registers) that are accessible in the microprocessor, and to change break points, if necessary. Program execution may then be resumed.

These types of techniques are often effective for debugging software, but are frequently of limited use in debugging microprocessors. This is because many debugging techniques are intrusive enough to perturb the normal operation of the microprocessor, thereby causing a problem to not appear.

Therefore, there is a need in the art for improved techniques for debugging microprocessors. In particular, there is a need for systems and methods for debugging a microprocessor that are minimally intrusive into the normal operation of a highly integrated microprocessor. More particularly, there is a need for systems and methods for accessing and examining selected internal components of a microprocessor without excessively perturbing the normal operation of the microprocessor and without requiring the addition of a large number of external pins.

SUMMARY OF THE INVENTION

The limitations inherent in the prior art described above are overcome by the present invention which provides a data processor having improved debugging features that are capable of transferring from the data processor selected ones of instructions, data, and addresses in response to the occurrence of one or more of execution of a branch instruction, detection of a trigger value on an internal bus, or execution of a unique spray instruction.

In one advantageous embodiment of the present invention, the data processor comprises: 1) a plurality of functional units capable of executing sequences of instructions, and 2) a debugging apparatus capable of detecting a change of flow from a first sequence of instructions to a second sequence of instructions. The debugging apparatus, in response to the detection, outputs from the data processor a first address associated with the change of flow.

In one embodiment of the present invention, the at least one of the plurality of functional units is capable of generating a change-of-flow (COF) signal when the change of flow occurs in the at least one functional unit.

In another embodiment of the present invention, the debugging apparatus comprises a register capable of receiving the COF signal and in response to the receipt of the COF signal, storing the first address associated with the change of flow.

In still another embodiment of the present invention, the register is a serial shift register capable of serially shifting the stored first address from the data processor.

In yet another embodiment of the present invention, the first address associated with the change of flow is an address associated with one of the second sequence of instructions.

In a further embodiment of the present invention, the debugging apparatus is further capable of determining that a conditional branch instruction executed by one of the plurality of functional units has not caused a change of flow.

In a still further embodiment of the present invention, the debugging apparatus, in response to the determination, outputs from the data processor a second address associated with the conditional branch instruction.

In a yet further embodiment of the present invention, the second address is an address of an instruction following the conditional branch instruction.

According to a second advantageous embodiment of the present invention, the data processor comprises: 1) a plurality of functional units capable of executing instructions, 2) a communication bus capable of transferring one or more of addresses, data, instructions, and control bits between the plurality of functional units, and 3) a debugging apparatus capable of detecting at least one of a selected address value, a selected data value, a selected instruction value, and a selected control bits value, and in response to the detection, capturing on the communication bus a selected number of the one or more of addresses, data, instructions, and control bits.

According to one embodiment of the present invention, the debugging apparatus comprises a built-in programmable logic analyzer (PLA) capable of monitoring the communication bus and detecting the at least one of a selected address value, a selected data value, a selected instruction value, and a selected control bits value.

According to another embodiment of the present invention, the programmable logic analyzer is further capable of capturing the selected number of one or more of addresses, data, instructions, and control bits.

According to still another embodiment of the present invention, the debugging apparatus further comprises a memory associated with the programable logic analyzer, wherein the programmable logic analyzer stores in the memory the captured selected number of one or more of addresses, data, instructions, and control bits.

According to yet another embodiment of the present invention, the selected number of one or more of addresses, data, instructions, and control bits captured by the programmable logic analyzer captures is a programmable number modifiable by a user.

According to a further embodiment of the present invention, the debugging apparatus is capable of transferring the captured selected number of the one or more of addresses, data, instructions, and control bits to an external bus associated with the data processor.

According to a still further embodiment of the present invention, the external bus comprises a peripheral component interconnect (PCI) bus.

According to a yet further embodiment of the present invention, the external bus comprises a main memory bus coupling the data processor to a system memory.

According to a third advantageous embodiment of the present invention, there is provided, for use in a data processor, a method of debugging a data processor comprising the steps of: 1) executing a debugging instruction, and 2) in response to the execution of the debugging instruction, outputting from the data processor at least one of an address and a data value associated with at least one instruction following the debugging instruction.

According to another embodiment of the present invention, the step of executing the debugging instruction enables a selected flag in the data processor, wherein the data processor, in response to the enablement of the selected flag, writes the at least one of an address and a date value to a selected output of the data processor.

According to still another embodiment of the present invention, the at least one instruction is the next sequential instruction following the debugging instruction.

According to yet another embodiment of the present invention, the step of executing the debugging instruction comprises the substep of determining that a data value associated with a current instruction matches a debug value stored in a debug register associated with the data processor.

According to yet another embodiment of the present invention, the debugging instruction comprises an opcode having a parity bit enabled.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
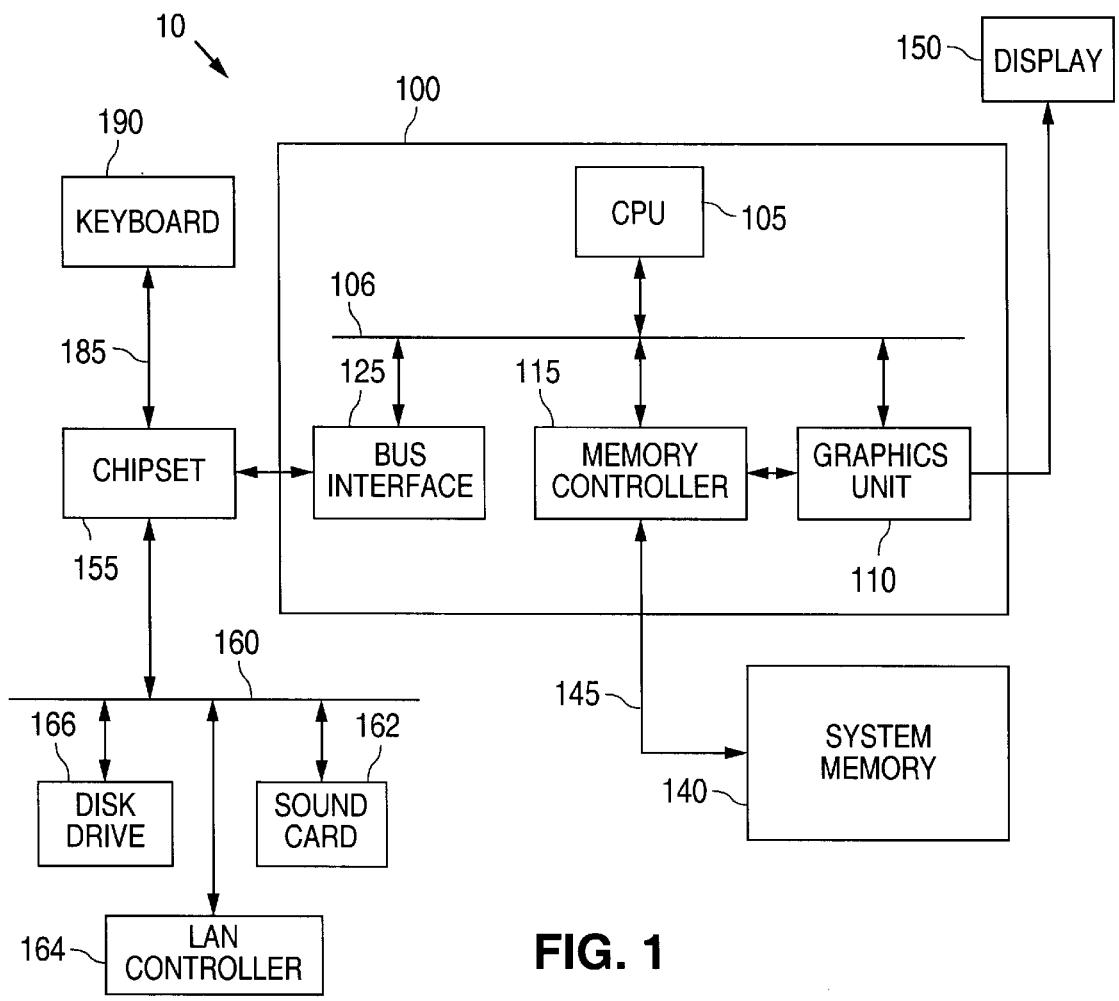
FIG. 1 is a block diagram of an exemplary processing system, which includes an integrated microprocessor according to one embodiment of the present invention.

FIG. 1 is a block diagram of prior art processing system 10, which includes integrated microprocessor 100. Integrated microprocessor 100 comprises central processing unit (CPU) 105, graphics unit 110, system memory controller 115, and bus interface 125, all of which are coupled to communication bus 106. Graphics unit 110 and system memory controller 115 may be integrated onto the same die as microprocessor 100.

Integrated memory controller 115 bridges microprocessor 100 to system memory 140, and may provide data compression and/or decompression to reduce bus traffic over external memory bus 145. Integrated graphics unit 110 may provide one or more of TFT, DSTN, RGB, and other types of video output to drive display 150. Bus interface unit 125 connects integrated microprocessor 100 to chipset bridge 155. In one embodiment of the present invention, bus interface unit 125 supports the peripheral component interconnect (PCI) bus interface.

Chipset bridge 155 provides a conventional peripheral component interconnect (PCI) bus interface to PCI bus 160, which connects chipset bridge 155 to one or more peripherals, such as sound card 162, LAN controller 164, and disk drive 166, among others. Chipset bridge may also connect to keyboard 190 through keyboard cable 185. In some embodiments, chipset bridge 155 may integrate local bus functions such as sound, disk drive control, modem, network adapter, and the like.

Debugging microprocessor 100 is a difficult process due to the high level of integration of the device. Many critical components and buses in microprocessor 100 are not readily accessible due to the limited number of external pins on the package for microprocessor 100. To overcome these limitations, the present invention provides debugging devices and methods that may be implemented in microprocessor 100 in order to perform debugging procedures that perturb the operation of microprocessor 100 as little as possible.

Figure 2:
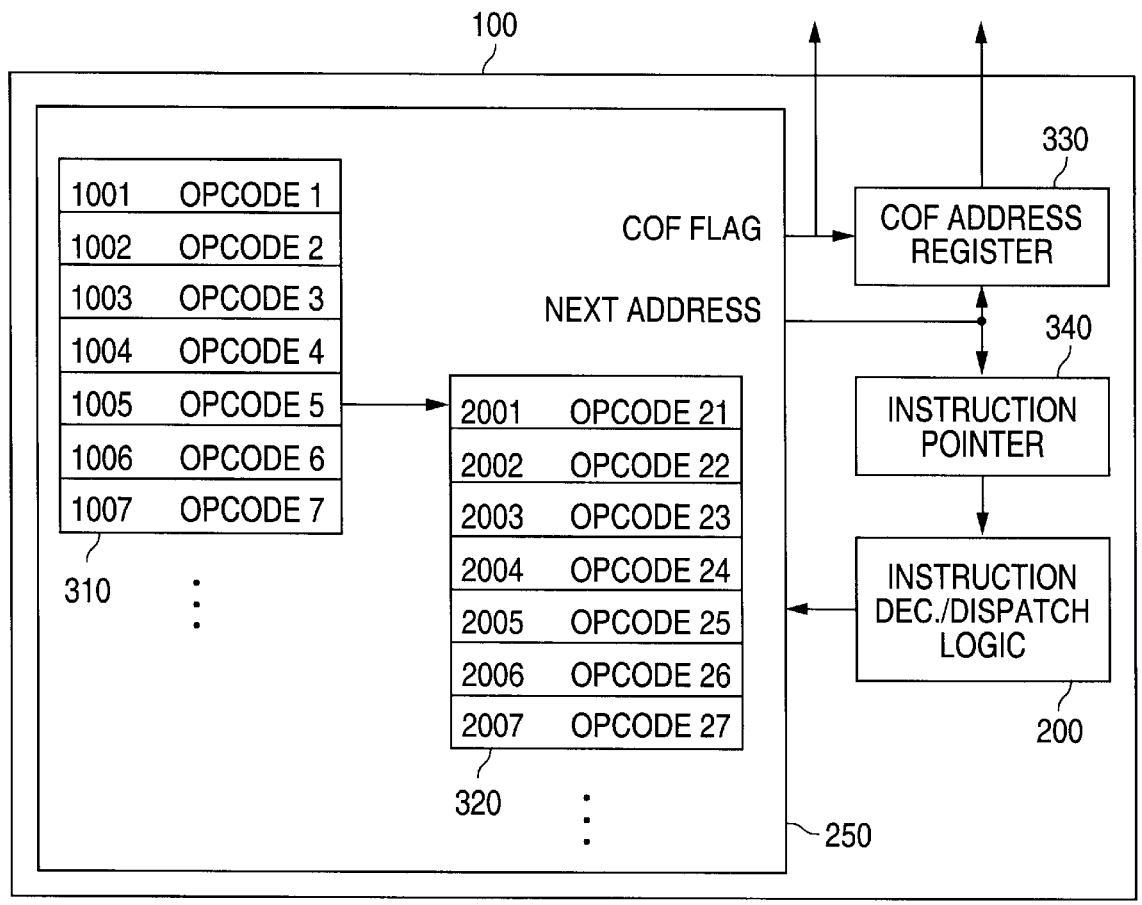
FIG. 2 illustrates an exemplary change-of-flow indicator in the exemplary microprocessor according to one embodiment of the present invention.

FIG. 2 illustrates an exemplary change-of-flow indicator capable of debugging exemplary microprocessor 100 according to one embodiment of the present invention. For the purposes of simplifying and clarifying the following explanation of the invention, selected portions of microprocessor 100 have been redrawn in simpler, higher level format. FIG. 2 illustrates functional units 250, instruction pointer 340, change-of-flow (COF) address register 330, and instruction decoder/dispatch logic 200 in microprocessor 100.

Functional units 250 in microprocessor 100, such as a floating point unit and an integer unit, execute sequences of operating code (opcode), such as code sequence 310 and code sequence 320, in a linear (or sequential) manner. For example, microprocessor executes code sequence 310 by first executing Opcode 1 in address 1001 and then incrementing linearly through to Opcode 7 in address 1007, unless a branch instruction is executed that results in a branch, or change-of-flow (COF), to a non-sequential address. Similarly, microprocessor 100 executes code sequence 320 by first executing Opcode 21 in address 2001 and then incrementing linearly through to Opcode 27 in address 2007, unless a branch instruction is executed that results in a branch, or change-of-flow (COF), to a non-sequential address. By way of illustration, a change-of-flow is illustrated in FIG. 2 in which program execution jumps from address 1005 in code sequence 310 to non-sequential address 2001 in code sequence 320.

It should be noted that the relative size and numbering of addresses and operating codes in FIG. 2 has been greatly simplified in order to clearly explain the operation of the present invention. Those skilled in the art will recognize that operating codes executed by microprocessors are typically of variable byte lengths. Some opcodes may comprise only one byte, while other opcodes may comprise, for example, two, three or four bytes. As a result, some opcodes may occupy more than one address location. This means that sequential opcodes may not begin on sequential address numbers. As noted above, however, the address numbering scheme in FIG. 2 has been simplified in order to clarify the explanation of the present invention. For this reason, sequential opcodes have been given sequential address numbers. This is for purposes of illustration only and should not be construed so as to limit the scope of the present invention.

Some microprocessors, such as x86-type processors available from National Semiconductor Corporation, implement an internal flag, called COF flag, that is activated whenever any change in linear flow-occurs, such as a conditional branch instruction, or a call, or an interrupt, in any of the functional units in the microprocessor. In a preferred embodiment of the present invention, microprocessor 100 implements a COF flag that indicates that a COF, such as a branch instruction (conditional or unconditional) has been taken.

The COF flag is generated by one of the components in functional units 250 and is sent to COF register 330 and to an external pin on microprocessor 100. In one embodiment, the COF flag signal may be set high (or active) for one clock cycle when a branch instruction is taken and may be set high for two clock cycles when a conditional branch is not taken.

One of the components in functional units 250 also provides the next instruction address as an input to instruction pointer 340 and COF address register 330. Instruction pointer 340 stores the next instruction address provided by functional unit 250 for use as required by instruction decode/dispatch logic 200. COF address register 330 also stores the next instruction address, which is serially shifted out of microprocessor 100 starting when the COF flag is active. Thus, the COF flag and serial output of COF address register 330 may be monitored by external logic to determine the branch instructions that are taken and not taken by microprocessor 100.

Figure 3:
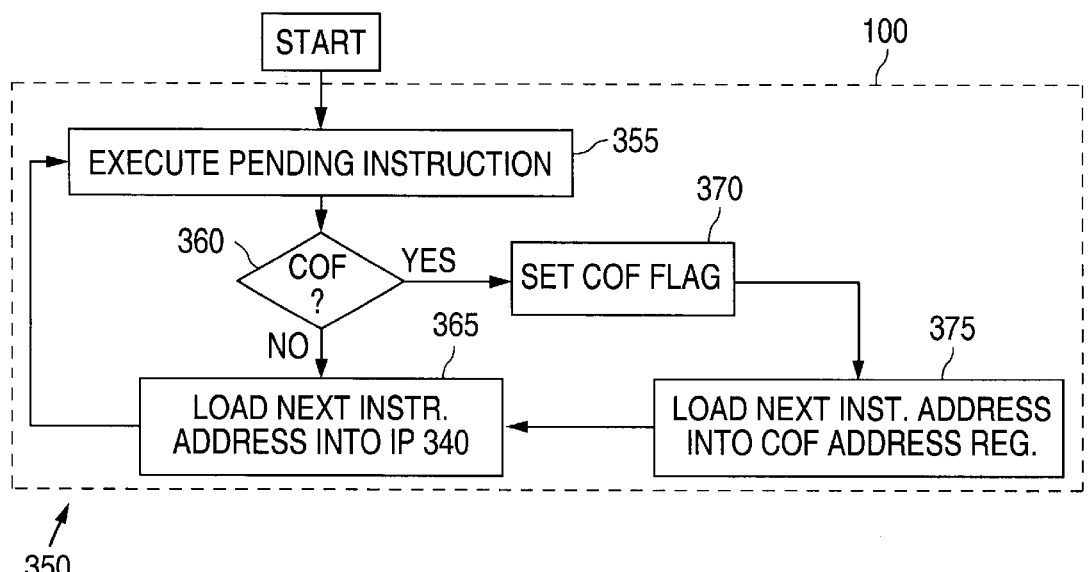
FIG. 3 is a flow chart illustrating the operation of the change-of-flow indicator according to one embodiment of the present invention.

FIG. 3 is a flow chart illustrating the operation of the change-of-flow indicator according to one embodiment of the present invention. Flow chart 350 depicts a change of flow process for taken branches in microprocessor 100. Microprocessor 100 executes the pending instruction in functional units 250 (process step 355). If during execution of the pending instruction, one of the components in functional units 250 determines that a COF has not occurred, the next instruction address is loaded into instruction pointer (IP) 340 (process steps 360 and 365). In reality, IP 340 may only be incremented to obtain the address of the next instruction, rather than having the next instruction address loaded into IP 340. The next instruction then becomes the pending instruction and processing continues (process step 355).

However, if during execution of the pending instruction, one of the components in functional units 250 determines that a change of flow (COF) has occurred, the COF flag is set (i.e., active) (process steps 360 and 370). COF address register 330 detects the active COF flag and loads the next instruction address (in the new branch) for subsequent serial output to external devices (process step 375).

In addition, the next instruction address is stored in IP 340 and is sent to instruction decode/dispatch logic 200, which uses it to fetch the next instruction from the new branch. The next instruction then becomes the pending instruction and processing continues (process steps 365 and 355).

Figure 4:
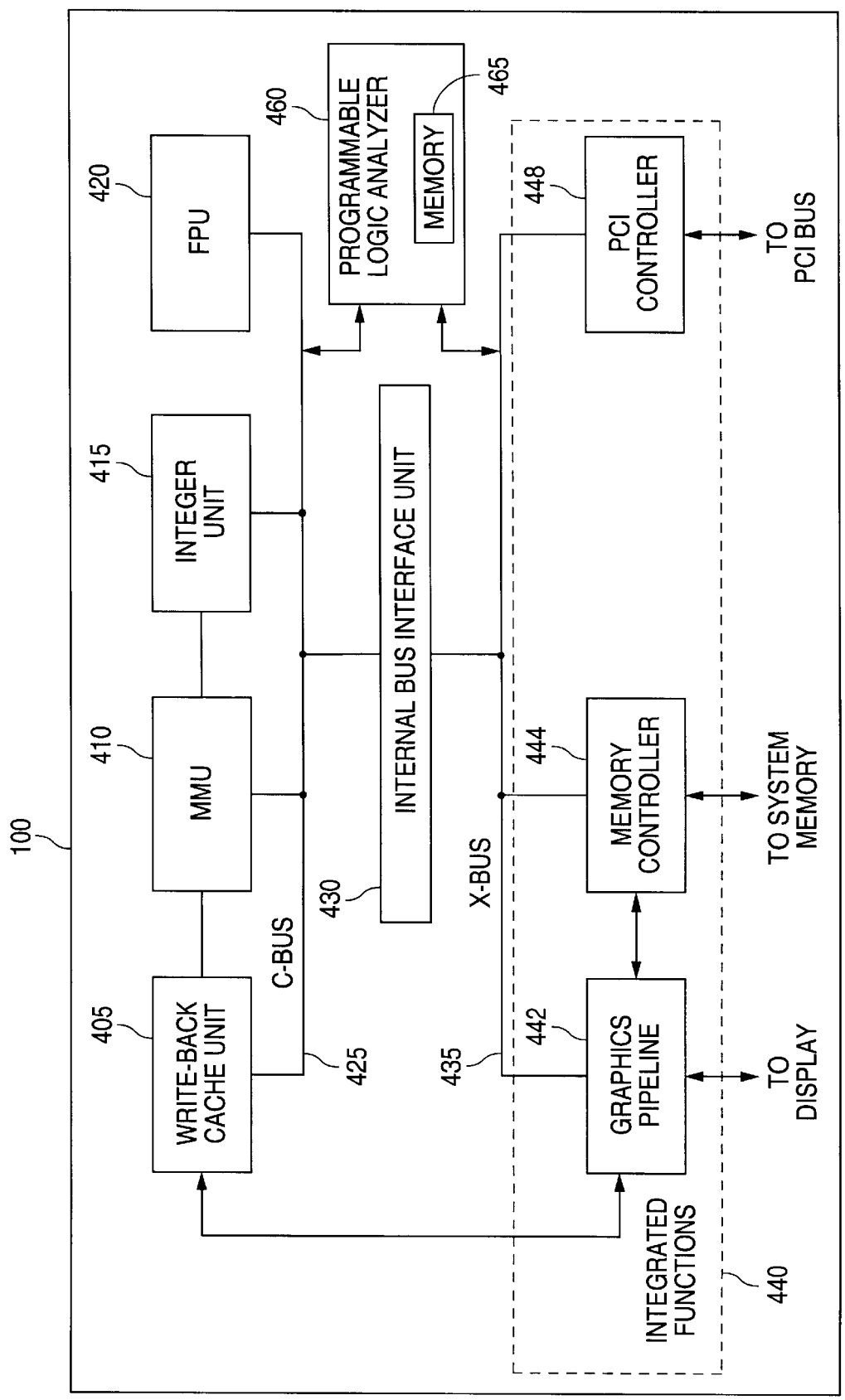
FIG. 4 illustrates an exemplary bus monitoring device capable of debugging the exemplary microprocessor according to one embodiment of the present invention.

FIG. 4 illustrates an exemplary bus monitoring device capable of debugging exemplary microprocessor 100 according to one embodiment of the present invention. The bus monitoring device comprises programmable logic analyzer (PLA) 460 and associated memory 465, which may be implemented to monitor one or more of the critical internal buses in microprocessor 100, including exemplary bus 425 (labeled "C-Bus") or bus 435 (labeled "X-Bus"), or both. Advantageously, since PLA 460 is built on-chip in microprocessor 100, PLA 460 can snoop (or watch or analyze) the bus traffic at CPU speed on the internal buses of microprocessor 100.

For the purposes of simplifying and clarifying the following explanation of the invention, only selected portions of microprocessor 100 are depicted, thereby providing a higher level architectural view of the critical buses in microprocessor 100.

FIG. 4 illustrates write-back cache unit 405, memory management unit (MMU) 410, integer unit 415, and floating point unit (FPU) 420, all of which-are connected to high speed bus 425, which may be, for example, the CPU local bus (or C-bus).

Internal bus interface unit 430 transfers data and addresses between bus 425 and bus 435, which is equivalent to bus 106. The other integrated functions on microprocessor 100 are coupled together on bus 435, and are represented by graphics pipeline 442 (equivalent to graphics unit 110), memory controller 444 (equivalent to memory controller 115), and PCI controller 448 (equivalent to bus interfaced unit 125). As shown in FIG. 4, graphics pipeline 442, memory controller 444, and PCI controller 448 are collectively referred to as integrated functions 440.

Programmable logic analyzer (PLA) 460 continually monitors bus traffic on bus 425 or bus 435, or both, and may capture a variable sized group (window) of addresses, control information, and/or data from bus 425 or bus 435, or both. PLA 460 stores the captured bus traffic in memory 465 for transfer to external test equipment. The type and amount of bus traffic stored by PLA 460 in memory 465 are programmable, including by external test equipment. PLA 460 may be programmed to trigger on a particular address value or a particular data value that appears on bus 425 and to capture a variable-sized window of bus traffic, wherein the triggering address or triggering data may be captured at the start of the window, at the end of the window, or anywhere in between.

By way of example, PLA 460 may be programmed to capture 64 cycles of bus information if it is triggered by Address X. Address X may be the first entry or the last entry in the 64-entry window stored in memory 465. Alternatively, Address X may be located at any entry between the first entry and the last entry in the 64-entry window stored in memory 465. Thus, a programmer may capture and view a movable window of bus traffic surrounding the triggering event, Address X.

PLA 460 may also cause microprocessor 100 to halt or suspend processing once PLA 460 has captured the required information. During the suspension period, PLA 460 may transfer the captured data on regular data and/or address pins for access by the external test equipment. Alternatively, PLA 460 may serially transfer the captured data out on specialized test debug pins. For example, PLA 460 may signal that data has been captured using the COF flag pin described in FIGS. 2 and 3 and may transfer the captured data out using the serially shifting next instruction address pin previously described in FIGS. 2 and 3. In another embodiment of the present invention, PLA 460 may acta as a bus master of, for example, bus 435 and may output the captured window of bus traffic on the PCI bus through PCI controller 448.

The ability for PLA 460 to capture data in real time, suspend microprocessor 100 operation, and transfer data to external test equipment provides external access to internal microprocessor 100 operations which are typically not available for test and debug purposes. PLA 460 software may comprise control bits for read, write, and fetch. These bits may be used to specify specific operations to be performed by PLA 460. For example, PLA 460 may transfer the content of memory 465 to the external test equipment when the write control bit is enabled. PLA 460 software may also be configured to cause an SMI once PLA 460 has triggered.

Figure 5:
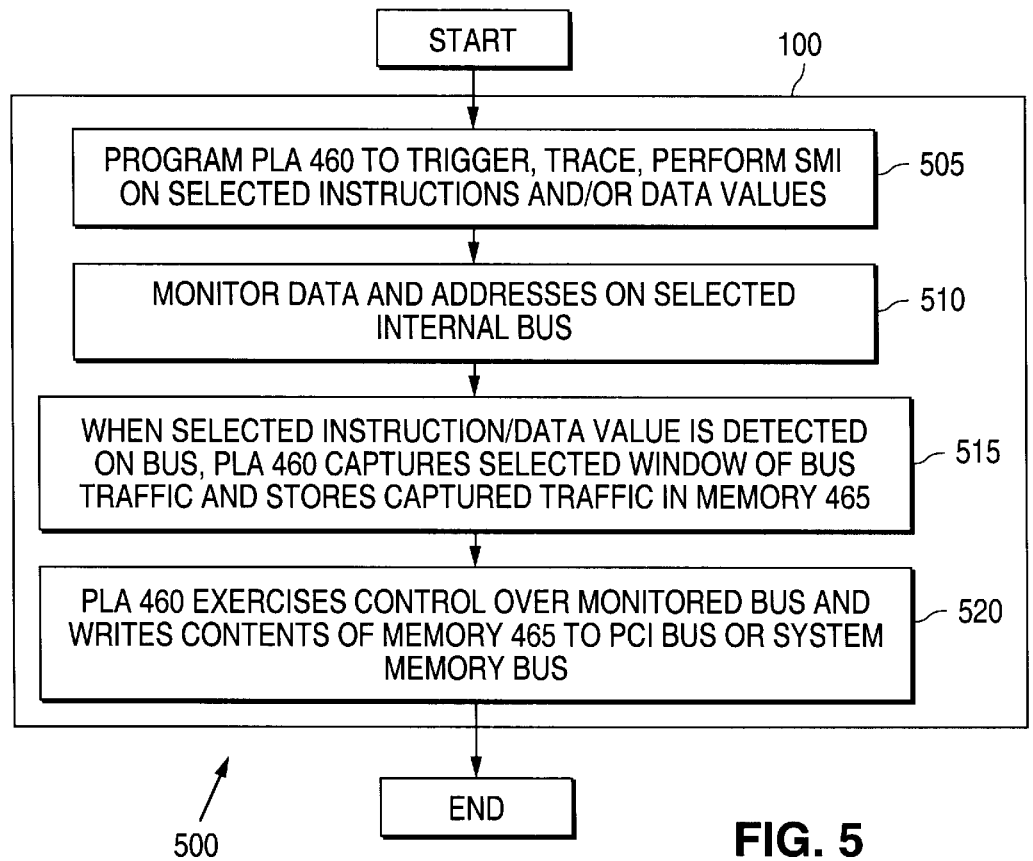
FIG. 5 is a flow chart illustrating the operation of the bus monitoring device in FIG. 4 according to one embodiment of the present invention.

FIG. 5 depicts flow chart 500, which illustrates the operation of the bus monitoring device in FIG. 4 according to one embodiment of the present invention. First, microprocessor 100 programs PLA 460 to trigger, to perform an SMI, or to trace on selected instructions and/or data values as seen on C-bus 425 or X-bus 435 (process step 505). Next, PLA 460 monitors the data and addresses on the selected internal bus for the appearance of the programmed instructions and/or data values (process step 510). When the software selected instruction/data value is detected on the specified bus, PLA 460 captures a software selected window of bus traffic and stores the captured traffic data in memory 465 (process step 515). Subsequently, PLA 460 controls the monitored internal bus as directed by software and writes or transfers the contents of memory 465 to PCI controller 448 for output on the PCI bus or to memory controller 444 for transfer to the system memory bus (process step 520).

In another embodiment of the present invention, there is provided a unique function capable of debugging a highly integrated microprocessor. The unique function, referred to hereafter as a "spray" function causes the address and data used by the next executed instruction to be output from microprocessor 100. The spray function may be implemented in several ways, including as an embedded instruction (operating code), as a trigger from a debug register, and by using the parity bits.

If the spray function is implemented as an embedded instruction, a unique SPRAY operating code (opcode) is preferably compiled into a copy of the source code of a program being executed. If the source code is not available, a programmer may use a debugger to halt the program at a selected location and then add the SPRAY opcode to the program in memory. This is usually not a problem, since compiler generated code often can be modified to reduce the number of bytes or instructions used, thereby freeing a memory location in which the SPRAY opcode may be inserted.

If the spray function is activated, microprocessor 100 outputs the address and data used by the next instruction on PCI bus 160 when the next instruction is executed. The spray function (or cycle) is identified by a unique spray identification (ID) code on the PCI pins that are also used to identify other PCI cycle types, such as read, write, input, output and special cycles. A logic analyzer implemented as a PCI card coupled to PCI bus 160 may be triggered by the unique spray ID code and may then capture the address and data that are output by the spray function.

In an exemplary embodiment, the SPRAY opcode may set an internal spray flag in microprocessor 100. This spray flag is detected by microprocessor 100 during execution of the next instruction and causes the next instruction to execute a spray cycle, wherein the address and data of the next instruction are written out on PCI bus 160, in addition to the normal operations performed by the next instruction. The spray cycle is only minimally intrusive to the normal operation of microprocessor 100 and is not likely to perturb the system enough to cause a problem that normally occurs to not occur. By way of example, some x86 architectures contain a one byte instruction called ICEBRK. The ICEBRK opcode is used only in debugging mode. In an advantageous embodiment of the present invention, a control bit in one of the control registers in microprocessor 100 may be used to change the operation of the ICEBRK opcode and cause it to operate as a SPRAY opcode.

The debug registers of CPU 105 of microprocessor 100 define a plurality of breakpoints that match on one of three events: 1) execution of an instruction, 2) a data read operation, or 3) a data write operation. If the spray function is implemented using the debug registers, the debug registers are modified so that when a debug match occurs, rather than taking a debug breakpoint or a system management interrupt (SMI), the spray flag is enabled. Execution continues at the same point in the program and microprocessor 100, during execution of the next instruction detects the setting of the internal spray flag (as described above) and outputs the address and data of the next instruction on PCI bus 160.

If the SPRAY function is implemented using the parity bits, the parity bit for the first byte of an opcode is redefined to be a debug bit. If the parity debug bit is set, then the program may trap to an SMI routine or may perform a spray cycle, or both. To support this implementation of the present invention, the parity bits are also stored in cache along with the normal cache entries. In one embodiment of the present invention, the value of the parity bit may be modified using a special purpose instruction. In an alternate embodiment of the present invention, the value of the parity bit may be modified by reenabling parity, modifying the first opcode byte to get the parity bit to the desired state, disabling parity and then restoring the first opcode byte to its original state. When microprocessor 100 detects that the parity bit of an instruction has been set, microprocessor 100 may output the address and data of the next instruction on PCI bus 160.

Figure 6:
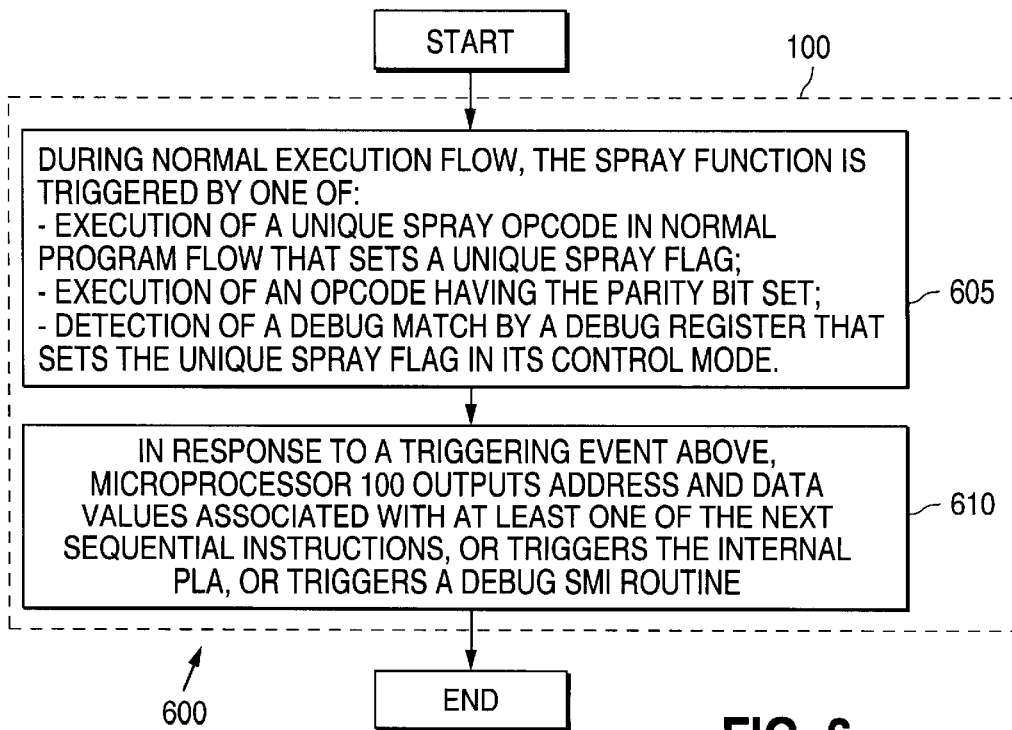
FIG. 6 is a flow chart illustrating the operation of the spray debugging function according to one embodiment of the present invention.

FIG. 6 depicts flow chart 600, which summarizes the operation of the spray debugging function in microprocessor 100 according to one embodiment of the present invention. During normal execution flow, the unique spray function implemented in microprocessor 100 is activated by a triggering event that includes the execution of the unique SPRAY opcode (described above) embedded in the normal program flow that sets a spray flag in microprocessor 100. The spray function may also be activated from a debug register that also sets the spray flag in microprocessor 100. Finally, the spray function may be activated by execution of an opcode in which the parity bit of the first opcode byte is set (process step 605).

In response to one of the triggering events above, microprocessor 100 outputs the address, or the data, or both, associated with at least one of the instructions next executed by microprocessor 100. In an advantageous embodiment of the invention, microprocessor 100 outputs the address and data only of the next sequential instruction that is executed. However, in alternate embodiments of the present invention, microprocessor 100 may output the addresses and data associated with more than one subsequent instruction (process step 610).

Although the present invention has been described in detail, those skilled in the art should understand that they can make various changes, substitutions and alterations herein without departing from the spirit and scope of the invention in its broadest form.

What is claimed is:

1. A data processor comprising:
   a plurality of functional units capable of executing sequences of instructions; and
   a debugging apparatus capable of detecting a trigger, said trigger comprising one of:
      execution of a spray operational code that sets a spray flag;
      execution of an operational code that has a parity debug bit set; and
      a debug match set by a debug register that sets a spray flag;
   wherein said debugging apparatus, in response to said detection of said trigger, outputs from said data processor an address value and a data value associated with an instruction next executed by said data processor.

2. The data processor as set forth in claim 1 wherein said debugging apparatus comprises a communication bus capable of transferring one or more of addresses, data, instructions, and control bits between said plurality of functional units and a programmable logic analyzer capable of monitoring said communication bus and detecting at least one of a selected address value, a selected data value, a selected instruction value, and a selected control bits value; and
   wherein said debugging apparatus, in response to said detection of said trigger, initiates an operation of said programmable logic analyzer.

3. The data processor as set forth in claim 1 wherein said debugging apparatus, in response to said detection of said trigger, initiates a debug system management interrupt routine.

4. The data processor as set forth in claim 1 wherein said debugging apparatus, in response to said detection of said trigger, outputs from said data processor a plurality of addresses and data associated with a plurality of subsequent instructions to be executed by said data processor.

5. The data processor as set forth in claim 1 wherein said debugging apparatus is capable of detecting a change of flow from a first sequence of instructions to a second sequence of instructions, wherein said debugging apparatus, in response to said detection of said change of flow, outputs from said data processor a first address associated with said change of flow and wherein said first address associated with said change of flow is an address associated with one of said second sequence of instructions.

6. The data processor as set forth in claim 1 wherein said debugging apparatus is capable of detecting a change of flow from a first sequence of instructions to a second sequence of instructions, wherein said debugging apparatus, in response to said detection of said change of flow, outputs from said data processor a first address associated with said change of flow and wherein said debugging apparatus is further capable of determining that a conditional branch instruction executed by one of said plurality of functional units has not caused a change of flow.

7. The data processor as set forth in claim 6 wherein said debugging apparatus, in response to said determination of said change of flow, outputs from said data processor a second address associated with said conditional branch instruction.

8. The data processor as set forth in claim 7 wherein said second address is an address of an instruction following said conditional branch instruction.

9. A data processor comprising:
   a plurality of functional units capable of executing instructions;
   a communication bus capable of transferring one or more of addresses, data, instructions, and control bits between said plurality of functional units; and
   a debugging apparatus capable of detecting at least one of a selected address value, a selected data value, a selected instruction value, and a selected control bits value, and in response to said detection, capturing on said communication bus a selected number of said one or more of addresses, data, instructions, and control bits;
   wherein said debugging apparatus is capable of detecting a trigger, said trigger comprising one of:
      execution of a spray operational code that sets a spray flag;

execution of an operational code that has a parity debug bit set; and a debug match set by a debug register that sets a spray flag;

wherein said debugging apparatus, in response to said detection of said trigger, one of:

outputs from said data processor an address value and a data value associated with an instruction next executed by said data processor and initiates a debug system management interrupt routine.

10. The data processor as set forth in claim 9 wherein said debugging apparatus comprises a programmable logic analyzer capable of monitoring said communication bus and detecting said at least one of a selected address value, a selected data value, a selected instruction value, and a selected control bits value; and wherein said debugging apparatus, in response to said detection of said trigger, initiates an operation of said programmable logic analyzer.

11. The data processor as set forth in claim 10 wherein said programmable logic analyzer is further capable of capturing said selected number of one or more of addresses, data, instructions, and control bits.

12. The data processor as set forth in claim 11 wherein said debugging apparatus further comprises a memory associated with said programable logic analyzer, wherein said programmable logic analyzer stores in said memory said captured selected number of one or more of addresses, data, instructions, and control bits.

13. The data processor as set forth in claim 12 wherein said selected number of one or more of addresses, data, instructions, and control bits captured by said programmable logic analyzer captures is a programmable number modifiable by a user.

14. The data processor as set forth in claim 9 wherein said debugging apparatus is capable of transferring said captured selected number of said one or more of addresses, data, instructions, and control bits to an external bus associated with said data processor.

15. The data processor as set forth in claim 14 wherein said external bus comprises a peripheral component interconnect (PCI) bus.

16. The data processor as set forth in claim 14 wherein said external bus comprises a main memory bus coupling said data processor to a system memory.

17. For use in a data processor, a method of debugging a data processor comprising the steps of:

executing a debugging instruction;

detecting a trigger, said trigger comprising one of:

execution of a spray operational code that sets a spray flag;

execution of an operational code that has a parity debug bit set; and a debug match set by a debug register that sets a spray flag; and in response to the detection of said trigger, outputting from the data processor an address value and a data value associated with an instruction next executed by said data processor.

18. The method as set forth in claim 17 further comprising the step of:

in response to the detection of said trigger, initiating an operation of a programmable logic analyzer coupled to a communications bus coupled to said debugging apparatus.

19. The method as set forth in claim 17 further comprising the step of:

in response to the detection of said trigger, initiating a debug system management interrupt routine.

20. The method as set forth in claim 17 wherein the step of executing the debugging instruction comprises the substep of determining that a data value associated with a current instruction matches a debug value stored in a debug register associated with the data processor.

21. The method as set forth in claim 17 wherein the debugging instruction comprises an opcode having a parity bit enabled.

* * * * *